United States Patent
Vilarrasa Llorens et al.

(10) Patent No.: US 12,274,972 B2
(45) Date of Patent: Apr. 15, 2025

(54) FILTER AND A METHOD FOR REMOVING ALDEHYDE-TYPE VOCS FROM INDOOR AIR

(71) Applicant: Air Tech Group, SLU, Sarral (ES)

(72) Inventors: Jaume Vilarrasa Llorens, Barcelona (ES); Lluis Bosch Hereu, Santa Maria de Palautordera (ES); Lluis Trench Roca, Sallent (ES)

(73) Assignee: AIR TECH GROUP, S.L.U., Sarral (ES)

( * ) Notice: Subject to any disclaimer, the term of this patent is extended or adjusted under 35 U.S.C. 154(b) by 386 days.

(21) Appl. No.: 17/788,397

(22) PCT Filed: Nov. 19, 2020

(86) PCT No.: PCT/EP2020/082639
§ 371 (c)(1),
(2) Date: Jun. 23, 2022

(87) PCT Pub. No.: WO2021/129985
PCT Pub. Date: Jul. 1, 2021

(65) Prior Publication Data
US 2023/0028077 A1     Jan. 26, 2023

(30) Foreign Application Priority Data
Dec. 23, 2019  (EP) ..................... 19383191

(51) Int. Cl.
*B01D 53/04*  (2006.01)
*B01D 53/86*  (2006.01)

(52) U.S. Cl.
CPC ..... *B01D 53/0407* (2013.01); *B01D 53/8687* (2013.01); *B01D 2253/20* (2013.01);
(Continued)

(58) Field of Classification Search
CPC ........ B01D 53/04; B01D 53/86; B01D 53/02; B01D 53/0407; B01D 53/8687
See application file for complete search history.

(56) References Cited

U.S. PATENT DOCUMENTS 4,392,963 A    7/1983  Perl
2004/0154470 A1  8/2004  Kishkovich
(Continued)

FOREIGN PATENT DOCUMENTS

CN    107321328 A    11/2017
EP    0955087 A1     11/1999
(Continued)

OTHER PUBLICATIONS

European Patent Office; International Search Report and Written Opinion for PCT/EP2020/082639; Feb. 22, 2021; entire document.

*Primary Examiner* — Sharon Pregler
(74) *Attorney, Agent, or Firm* — ALLEN, DYER, DOPPELT & GILCHRIST, P.A.

(57) ABSTRACT

A filter and a method for removing aldehyde-type VOCs from indoor air are disclosed. The filter includes a casing acting as a container. The container comprises two air-permeable opposite walls through which a volume of said indoor air flows and houses one or more natural polyphenols and a catalytic agent. The filter acts as an absorption filter, reacting irreversibly with the aldehyde-type VOCs of the indoor air. The natural polyphenols are powdered polyphenols selected from resveratrol (3,4',5-trihydroxystilbene), resorcinol (1,3-benzenediol), pyrogallol (1,2,3-benzenetriol), phloroglucinol (1,3,5-benzenetriol) and hydroquinone (1,4-benzenediol), or combinations thereof. The catalytic agent is a solid sulfonic acid. A mixture of the natural polyphenols and said catalytic agent are present, in the container, as compacted block elements. An air-purifying/

(Continued)

decontaminating device comprising the filter is also disclosed.

16 Claims, 3 Drawing Sheets

(52) U.S. Cl.
CPC .... *B01D 2253/34* (2013.01); *B01D 2257/406* (2013.01); *B01D 2257/708* (2013.01); *B01D 2258/06* (2013.01); *B01D 2259/4508* (2013.01)

(56) References Cited

U.S. PATENT DOCUMENTS

| 2013/0052113 A1* | 2/2013 | Molins | B01D 53/04 423/210 |
|---|---|---|---|
| 2014/0161675 A1 | 6/2014 | Lee | |
| 2016/0228811 A1 | 8/2016 | Meirav et al. | |

FOREIGN PATENT DOCUMENTS

| JP | H11226100 A | 8/1999 |
|---|---|---|
| WO | WO2017114687 | 7/2017 |

* cited by examiner

FILTER AND A METHOD FOR REMOVING ALDEHYDE-TYPE VOCS FROM INDOOR AIR

TECHNICAL FIELD

The present invention relates to an air filter, specifically for an air-purifying or air-decontaminating device, for removing or substantially eliminating contaminants from indoor air, suitable for use in residential areas, hospitals, leisure areas and work-space areas. The filter comprises a casing acting as a container, one or more natural polyphenols and a catalytic agent. A mixture of the natural polyphenols and the catalytic agent is present in the container as compacted block elements.

The air filter relates specifically to a filter suitable for trapping or removing aldehyde-type Volatile Organic Compounds (VOCs), where the main aldehyde-type VOC to be captured or removed from indoor air is formaldehyde (HCHO, methanal).

Furthermore, the disclosed air filter may also remove or eliminate amine-type VOCs and ammonia, as well as imines and aminals that come from their reaction with aldehydes, from indoor air.

Throughout this document, the acronym "VOC" or "VOCs" may be used instead of the term "Volatile Organic Compounds".

BACKGROUND

In the present state of the art, there exists a wide range of air filters available in the market capable of trapping VOCs containing an aldehyde functional group, mainly formaldehyde, such as those disclosed in document US 2016/228811-A1, in which the filter comprises a solid supported amine filtering medium made up of a liquid amine and one or more granular solid support materials (including silica, clay, alumina, carbon, polymer, fibre or combinations thereof) arranged in one or more filter sheets, providing an interaction between the amines present in the filter and the formaldehyde present in the air, flowing through said filter medium.

Document WO 2017/114687 discloses a multi-layer air filter made up of a first layer including a catalyst, a second layer including amines and an optional third layer, which is made up of a water absorbing and releasing material, such as a hygroscopic material.

Polyphenols, such as resorcinol, are known to react with formaldehyde monomer, obtained from aqueous solutions of formaldehyde (of polymeric nature, known as formol or formalin) by heating under basic conditions, since the beginnings of the polymer chemistry. Phenol-formaldehyde (PF) polymers, also known as phenolic resins, in general, and resorcinol-formaldehyde resins in particular (known as resoles), are found in many industrial products and are formed by step-growth polymerization.

Document US 2013/052113 discloses a method for purifying air and an air purifier used for purifying air, wherein the air purifier comprises a filter with a fibrous structure having a photocatalytic action coating, and a fan or turbine which forces air to pass through the filter, removing VOCs. The air purifier may further comprise a scavenger medium, such as phenolic compounds (e.g. resorcinol).

Document CN 107321328 discloses a VOC adsorbent and a process for obtaining such a VOC adsorbent, whose composition includes poly(vinyl alcohol), water, plant polyphenols, kaolin, acidic liquid and a defoamer.

Document JPH11-226100 discloses a filter containing a formaldehyde absorbent, i.e. plant polyphenols, specifically tea-derived polyphenols such as flavan-3-ol and/or flavan-3-ol derivatives.

BRIEF DESCRIPTION OF THE INVENTION

The present invention aims to improve and solve certain issues regarding the air filters available in the market by adding in a container of the air filter a mixture of one or more polyphenolic substances and a catalytic agent, or catalyst, as compacted block agents, which then react with aldehyde-type VOCs, mainly formaldehyde, which is a critical indoor pollutant. The above-mentioned reaction of formation of phenol-formaldehyde polymers, conveniently and innovatively developed, has allowed to remove formaldehyde gas at ppm (parts per million) concentrations. One of the components of the filter allows one to also trap ammonia and amine-type VOCs present in any air flow (urine-type odours), as well as imines and aminals arising from the reaction of aldehydes with said nitrogen compounds.

Formaldehyde is highly reactive as well as toxic, allergenic and carcinogenic, and when it is present in indoor air at certain levels it poses a significant safety hazard, leading to multiple health problems. Formaldehyde in concentrations above 0.1 ppm (parts per million) can cause eye irritation, while inhaling said air can also cause headaches, throat irritation and shortness of breath (SOB). Formaldehyde present in indoor air in a concentration equal to or above 5 ppm may lead to death.

Even though formaldehyde and its derivatives pose all these health risks, they are still widely used in a wide variety of applications such as: i) resins and adhesives, used during flooring and carpeting or in the process of fabricating furniture, among others, wherein these industrially prepared resins and adhesives, once applied to a building, may gradually release traces of formaldehyde into the indoor air, a process which is accelerated when exposed to heat, e.g. owing to a heating source (radiator) located nearby, or to sunlight; ii) a disinfectant, when present in an aqueous solution used mainly in operating theatres and other rooms in hospitals or cleanrooms, as it kills most bacteria and fungi that may be present; iii) preservation aqueous solutions, known as formalin or formol, for biological organs in hospitals, museums and biology laboratories.

Therefore, the present invention discloses, in accordance with a first aspect, an air filter for use in an air-purifying or air-decontaminating device for removing VOCs, particularly aldehyde-type VOCs, and in certain embodiments amine-type VOCs as well, from indoor air. The air filter includes at least one casing acting as a container. The container comprises two air-permeable opposite walls through which a volume of indoor air flows. The casing houses one or more natural polyphenols and a catalytic agent.

The air filter acts as an absorption filter, reacting irreversibly with the aldehyde-type VOCs of the indoor air. Due to this irreversible reaction, the air filter is capable of absorbing very rapidly any trace of formaldehyde present in indoor air, as well as (although not so rapidly) other aldehyde-type VOCs, which are less reactive, volatile and toxic than formaldehyde.

Regarding the one or more natural polyphenols, which are present in powder state (i.e. powdered polyphenols), they are particularly selected from a group comprising resveratrol (3,4',5-trihydroxystilbene, a natural product very abundant in the peel of red grapes and in red wine), resorcinol (1,3-benzenediol), pyrogallol (1,2,3-benzenetriol), phloroglucinol (1,3,5-benzenetriol) and hydroquinone (1,4-benzenediol), or a combination thereof.

In addition, the catalytic agent is a solid sulfonic acid.

According to the proposed air filter, a mixture of said one or more natural polyphenols and said catalytic agent are present, in the container, as compacted block elements.

According to the invention, the compacted block elements can be either in the form of granules or in the form of pellets.

The granules can have a diameter comprised between 0.8 mm and 1.2 mm, preferably 1 mm, whereas the pellets can have a diameter comprised between 2.5 and 3.5 mm, preferably 3 mm.

In an embodiment, the compacted block elements are obtained through a pressure compaction process of the one or more polyphenols and catalytic agent.

In another embodiment, the compacted block elements are prepared through a pressure compaction process at room temperature of the one or more natural polyphenols and catalytic agent with the addition of (one or more) binder or binding agents such as cellulose, derivatives thereof or poly(1-vinylpyrrolidin-2-one) (povidone, PVP), among others.

In certain embodiments, the air filter may comprise a plurality of casings arranged in a honeycomb configuration, wherein said two air-permeable opposite walls are defined by two webs.

In certain embodiments of the air filter, by increasing the proportion of the sulfonic acid component, the filter is also capable of absorbing significant amounts of amine-type VOCs and ammonia, as well as of imines and aminals arising from the reaction of amines with aldehydes.

The polyphenols included in the mixture are selected for removing aldehyde-type VOCs present in the indoor air, including but not limited to: acetaldehyde or ethanal, glyoxal or ethanedial, propionaldehyde or propanal, acrolein or propenal, propargyl aldehyde or propynal, methylglyoxal or 2-oxopropanal, glyoxylic acid and their alkyl esters, butyraldehyde or butanal, isobutyraldehyde or 2-methylpropanal, methylacrolein or 2-methylpropenal, both isomers of crotonaldehyde or 2-butenal, valeraldehyde or pentanal and isovaleraldehyde or 3-methylbutanal, and particularly formaldehyde (HCHO, methanal). Longer-chain aldehydes (i.e., aldehydes of higher molecular weight than those mentioned), such as those used in the cosmetic industry, may also be slowly absorbed, but they have a pleasant odour and their capture is not deemed as necessary.

These aldehyde-type VOCs may contaminate indoor air as a consequence of the reaction of olefins, such as unsaturated hydrocarbons from the petroleum industry and several essential oils and natural perfumes used as air fresheners, with ozone, coming from the outside or generated internally by laser printers, photocopiers, ionic air purifiers, arc welders or motor brushes. Atmospheric oxidation of ethanol vapour (from alcoholic drinks) and other short-chain primary alcohols (from perfumes) may also produce aldehyde-type VOCs.

The sulfonic acid used as the catalytic agent can be selected among any of the following:

any arenesulfonic acid (Ar—SO$_3$H), such as p-toluenesulfonic acid (TsOH·H$_2$O or TsOH), or benzenesulfonic acid (BsOH), any alkanesulfonic acid (R—SO$_3$H), such as 10-camphorsulphonic acid (CSA), any sulfonic acid resin, such as strong-acid ion-exchange resins, or sulfonic acid polymers, added as a finely divided powder, thymol blue in its acidic form and related triphenylmethane-sulfonic dyes, food dyes (such as Allura Red, E129, or Ponceau 4R, E124, and related azo derivatives) in their acidic form, or any long-chain alkyl hydrogen sulphate or aryl hydrogen sulphate, RO—SO$_3$H or ArO—SO$_3$H, respectively, such as common detergents and surfactants in their acidic form.

In an embodiment the polyphenols and the sulfonic acid are used, respectively, in a 1.0-2.0 to 0.1-1.0 w/w ratio, preferably in a 1.0 to 0.2 w/w ratio.

In an embodiment the polyphenol is resveratrol.

In another embodiment, in particular when using granules as compacted block elements, the word "polyphenol" refers to a mixture of resveratrol and resorcinol in a proportion between 10% and 75% of resveratrol and between 75% and 10% of resorcinol, with a 15% w/w of the solid sulfonic acid, TsOH·H$_2$O (p-toluenesulfonic acid). In case of using pellets, these percentages can be reduced because of the addition of 15-20% w/w of binders.

In yet another embodiment, in particular when using granules as compacted block elements, the polyphenols used are a mixture of resveratrol and resorcinol in a proportion between 30% and 40% of resveratrol and between 40% and 30% of resorcinol. In this last case, the solid sulfonic acid, TsOH·H$_2$O, is present in a 30% proportion. For the case of using pellets, the polyphenols used in the pellets are preferably a mixture of resveratrol and resorcinol in a proportion between 20% and 35% of resveratrol and between 35% and 20% of resorcinol, wherein the solid sulfonic acid is present in a 30% proportion and the binders or binding agents can be present in a 15-20% proportion.

In another aspect, the present invention also provides an air-purifying or air-decontaminating device that includes the air filter of the first aspect of the invention.

In yet another aspect, the present invention further discloses a method for removing VOCs from indoor air, in particular aldehyde-type VOCs, wherein a controlled airflow of contaminated indoor air is passed through an air filter comprising a casing acting as a container, said container including two air permeable opposite walls through which a volume of said contaminated indoor air flows, the casing housing one or more natural polyphenols and a catalytic agent, said aldehyde-type VOCs reacting with said one or more natural polyphenols in the presence of said catalytic agent, generating a polymeric polyphenol-aldehyde resin, which is retained in the filter.

According to the proposed method, the one or more natural polyphenols are in a powder state and are selected from a group comprising: resveratrol (3,4',5-trihydroxystilbene), resorcinol (1,3-benzenediol), pyrogallol (1,2,3-benzenetriol), phloroglucinol (1,3,5-benzenetriol) and hydroquinone (1,4-benzenediol) or a combination thereof. The catalytic agent is a solid sulfonic acid. A mixture of said one or more natural polyphenols and said catalytic agent are present, in the container, as compacted block elements (either in the form of granules or pellets) that captures said aldehyde-type VOCs.

According to the proposed method, the VOCs can also include amine-type VOCs and ammonia, as well as imines and aminals arising from their reaction with aldehyde-type VOCs.

The reactions that take place in the filter, owing to the aldehyde-type VOCs present in the indoor air, will at some point reach a saturation level and will therefore be ineffective, and therefore the method further includes an additional step in which the air filter is removed and exchanged once the saturation level has been reached, as indicated by a visual indicator.

In certain embodiments, the indicator is the result of the sulfonic acid-catalysed reaction of formaldehyde and related VOCs with the polyphenol or the polyphenol mixture included in the filter, which gives rise to a red or reddish-brown polymer when the reaction of formaldehyde and related VOCs with the polyphenol or the polyphenol mixture used in the filter is completed. In other embodiments, the indicator may be the result of the change of colour of thymol blue and related dyes or of food dyes and related azo dyes, all of them used in their sulfonic acid forms, i.e. when the acid groups had been neutralized by ammonia, amine-type VOCs, and/or derivatives of aldehydes and ammonia or amines.

It will be understood that any range of values given may not be optimal in extreme values and may require adaptations of the invention to these extreme values, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF PREFERRED EMBODIMENTS

Figure 1A:
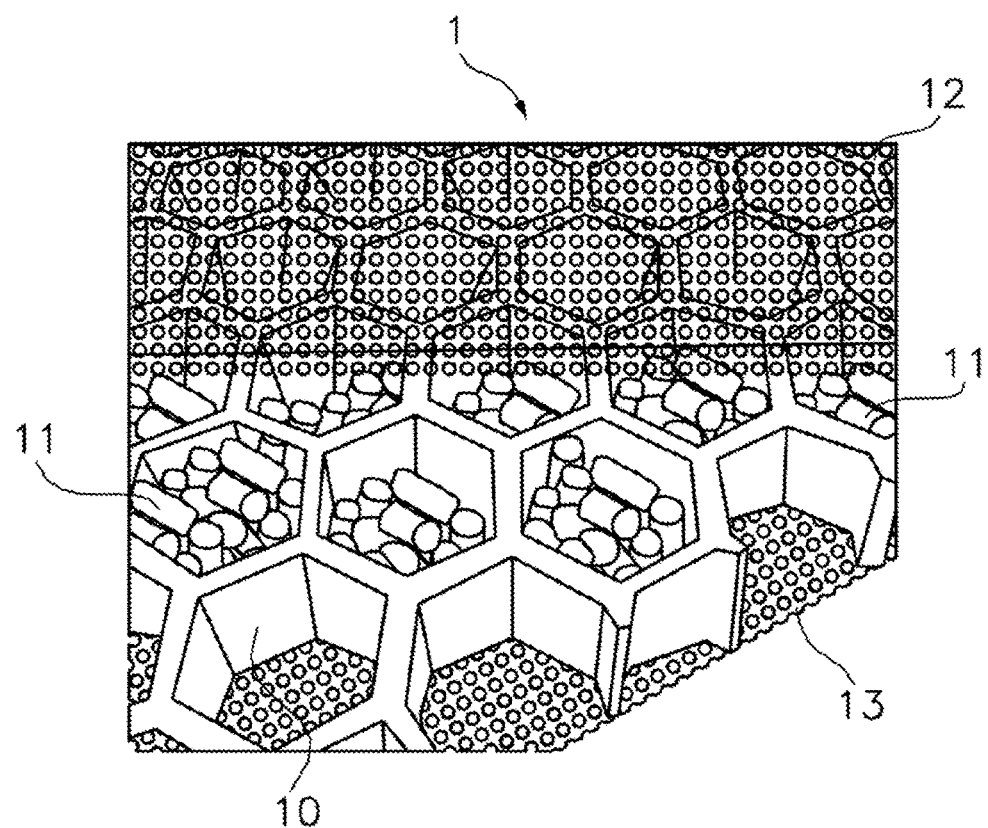
FIGS. 1A-1C graphically illustrate an example of an air filter for removing aldehyde-type VOCs from indoor air, according to an embodiment of the present invention.
Figure 1B:
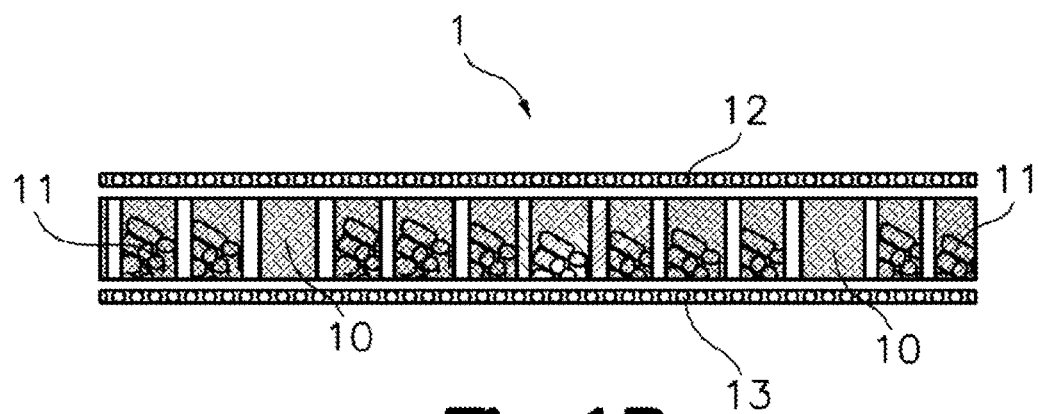
Figure 1C:
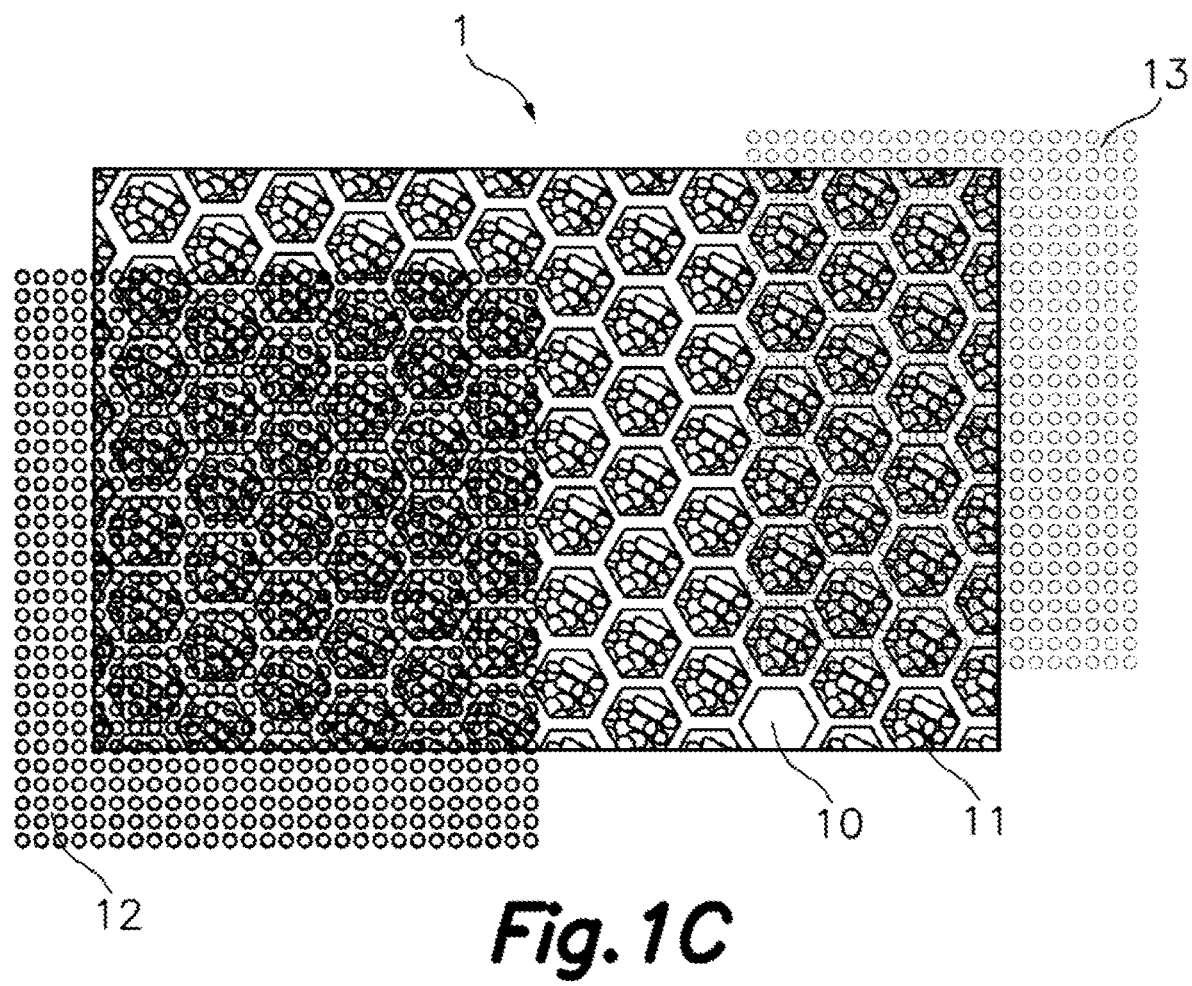

With reference to FIGS. 1A, 1B, 1C, therein it is illustrated an embodiment of the proposed air filter 1 for an air-purifying or air-decontaminating device. According to this embodiment, the air filter 1 includes a plurality of casings 10 arranged in a honeycomb configuration. Each casing 10 of the proposed air filter 1 act as a container of a plurality of compacted block elements 11, in this particular case in the form of pellets; however, although not illustrated, in other embodiments the compacted block elements 11 can be in the form of granules. Different sizes of granules or pellets can be used in order to remove VOCs from indoor air, in particular aldehyde-type VOCs (i.e. VOCs of the aldehyde type), and in certain embodiments amine-type VOCs, ammonia, as well as imines and aminals arising from their reaction with aldehyde-type VOCs; however, in preferred embodiments of the present invention the diameter of the granules is about 1 mm whereas the diameter of the pellets is about 3 mm. As also seen in FIGS. 1A-1C, the air filter 1 also includes two air-permeable opposite walls that are defined by two webs 12, 13.

The compacted block elements 11 are formed by a mixture of one or more natural powdered polyphenols and a catalyst, or catalytic agent.

In a preferred or particular embodiment, the compacted block elements 11 are prepared as granules by performing a pressure compaction process at room temperature of the one or more natural powdered polyphenols and a sulfonic acid. In another preferred or particular embodiment, the compacted block elements 11 are prepared in the form of pellets. In this case, complementarily, one or more binders or binding agents, such as cellulose, cellulose derivatives and/or povidone or poly(1-vinylpyrrolidin-2-one), among others, are also added to prepare the corresponding pellets 11 by an extrusion process at room temperature.

It should be noted that in other embodiments, although less preferred, the pellets can be prepared without the addition of the cited binding agent(s). Equally, in other embodiments, the granules can be prepared by adding to the mixture of the one or more natural powdered polyphenols and catalytic agent one or more binders or binding agents.

Figure 2:
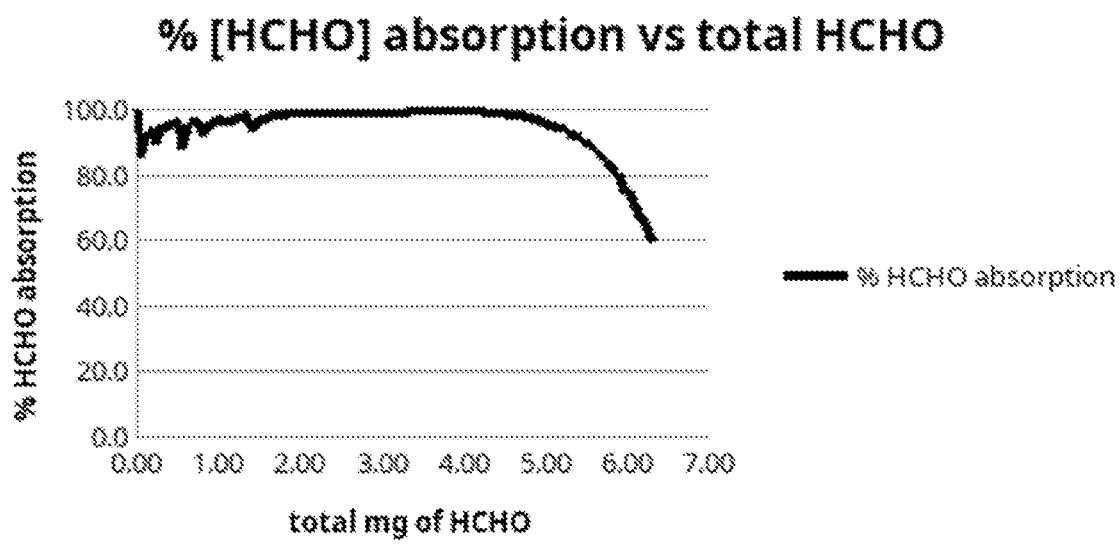
FIG. 2 shows a first graph, which compares the quantity/amount of formaldehyde (HCHO or $CH_2O$, methanal) absorbed or captured by the filter (Y-axis) in relation to the accumulated quantity of HCHO that has passed through said filter (X-axis)
Figure 3:
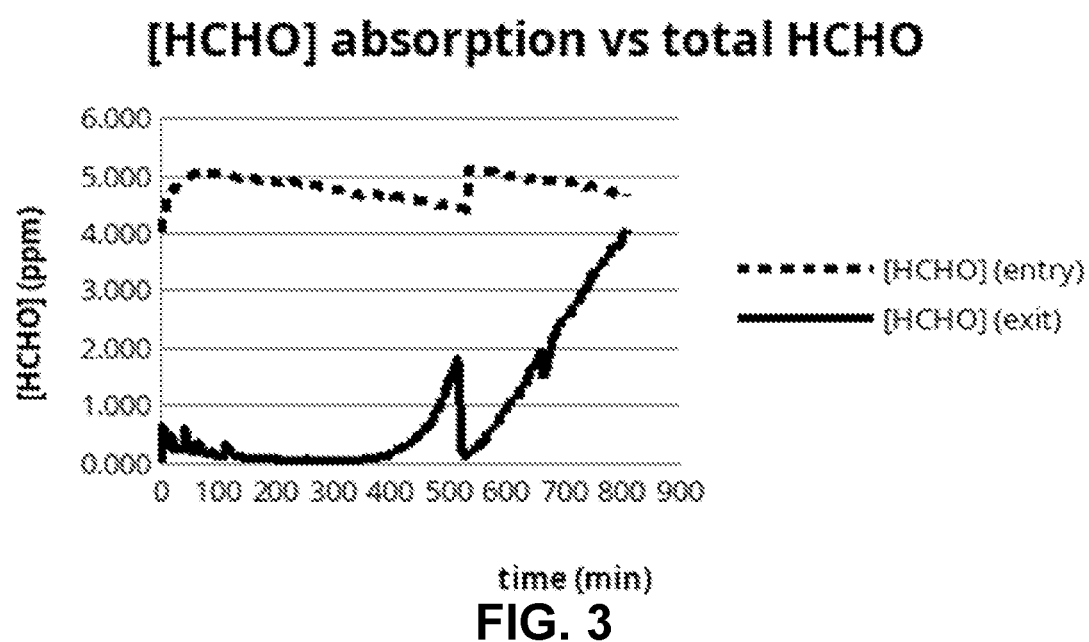
FIG. 3 shows a second graph that indicates the amount of HCHO absorbed by the filter during a first cycle (Y-axis) in relation to the time that has passed (X-axis), in which a flow of contaminated air with a concentration between 5 ppm and 4.41 ppm of HCHO is introduced, equivalent to the graph shown in FIG. 2.

The graphs shown in FIG. 2 and FIG. 3, discussed herein, show results obtained in a laboratory experiment performed under certain predetermined conditions, with an increasing exposure to a concentration of formaldehyde of up to approximately 5 ppm which far exceeds the recommended permissible exposure limit for humans during a prolonged period of time, usually set between 0.75 ppm and 1.0 ppm (taking into account that concentrations of approximately 0.1 ppm of formaldehyde can also be perceived as well as affect humans, e.g. odours and/or irritation), and at a much smaller scale. These graphs only show the absorption of HCHO during a first cycle.

The conditions used to test the effectiveness of the air filter with regards to its ability to absorb HCHO were performed in a column with a diameter of 2.5 cm filled with pellets prepared at room temperature from resveratrol (2.5 g), resorcinol (2.5 g), TsOH·$H_2O$ (1.0 g) as active ingredients, and cellulose (1.5 g) and povidone (0.5 g) as binders or binding agents, with a height or thickness of 4.0 cm.

Contaminated air was passed through these pellets at an air flow rate of approximately 2.0 L/min and a speed of 0.42 m/s. The contaminated air that flows through the column had a concentration of formaldehyde of 4.360 ppm.

As shown in the graphs, for these conditions, the amount of HCHO absorbed or captured by the filter inside the column is most effective during the first 100-150 min, wherein the filter absorbs approximately 100% of HCHO present in the flow of air flowing through the filter (already during the first cycle). Once this maximum percentage has been reached, the tendency of the slope shown in these graphs with regards to the amount of HCHO absorbed or trapped is gradually lower; indicating that the pellets inside the column simulating the filter is becoming saturated and therefore absorbs HCHO less effectively. Additionally, it is also possible to observe that when the filter seems to reduce part of its high efficiency, after a break period of time, the filter recovers its potential for a while.

In a preferred embodiment the casing of the air filter has the following dimensions in cm: 40 length×20 width×4 height. However, these dimensions are non-limitative and may vary accordingly, so that the air filter can be inserted adequately into all kinds of air-purifying or air-decontaminating devices.

In general, the different components that form the mixture (i.e. polyphenols and catalytic agent) can be used in a 1.0-2.0 and 0.1-1.0 w/w ratio, respectively. In a particular embodiment, the polyphenols and the catalytic agent are used in a 1.0 to 0.2 w/w ratio.

It has been proved through different tests that the proposed air filter can also be highly effective for the elimination of malodours caused by amines and/or $NH_3$ (urine smell). To this end it has also been noted that it would be favourable to increase the proportion of sulfonic acid used to the detriment of one polyphenol. Thus, considering a typical composition of the granules (which do not contain binding agents) as the one previously referred with the following proportions: 40% resveratrol, 50% resorcinol and 10% of sulfonic acid, the latter can be increased up to 30% when resorcinol being limited to 30% and resveratrol kept to 40%, only as an example, not limitative, providing an air filter highly effective for filtering aldehyde-type VOCs and at the same time removing referred malodours.

For the pellets, which contain binding agents, it has also been noted that it would be favourable for the removal of amines and related nitrogenated compounds to increase the proportion of sulfonic acid used to the detriment of one polyphenol. Thus, considering a typical composition with 35% resorcinol, 35% resveratrol, 15% of p-toluenesulfonic acid and 15% of binders, the resorcinol percentage or the resveratrol percentage can be reduced to 20% and the sulfonic acid increased to 30%, only as examples, not limitative, providing an air filter highly effective for removing aldehyde-type VOCs and at the same time removing the referred malodours.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of the filter embodiments may be included in some embodiments and not in others. Therefore, the foregoing description is provided primarily for exemplary purposes and should not be interpreted to limit the scope of the invention as it is set forth in the claims.

What is claimed is:

1. A filter for removing aldehyde Volatile Organic Compounds (VOCs) from indoor air, said filter being an absorption filter and configured to react irreversibly with the aldehyde VOCs of the indoor air, said filter comprising at least one casing configured to acting as a container, said container comprising two air-permeable opposite walls configured to allow a flow therethrough of a volume of the indoor air, said casing structured to housing one or more natural polyphenols and a catalytic agent, said one or more natural polyphenols comprise powdered polyphenols and are selected from the group consisting of: resveratrol (3,4',5-trihydroxystilbene), resorcinol (1,3-benzenediol), pyrogallol (1,2,3-benzenetriol), phloroglucinol (1,3,5-benzenetriol) and hydroquinone (1,4-benzenediol), or a combination thereof, and said catalytic agent comprises a solid sulfonic acid, wherein a mixture of said one or more natural polyphenols and said catalytic agent are present, in the container, as compacted block elements.

2. The filter according to claim 1, wherein said compacted block elements in the form of granules or in the form of pellets.

3. The filter according to claim 2, wherein the granules have a diameter between 0.8 mm and 1.2 mm, and wherein the pellets have a diameter between 2.5 and 3.5 mm.

4. The filter according to claim 1, wherein said compacted block elements are obtained through a pressure compaction process at room temperature of said one or more natural polyphenols and said catalytic agent.

5. The filter according to claim 1, wherein said block elements are obtained through a pressure compaction process at room temperature of said one or more natural polyphenols and said catalytic agent with the addition of at least one binder or binding agent selected among cellulose, derivatives thereof or poly(1-vinylpyrrolidin-2-one), also called povidone or PVP.

6. The filter according to claim 1, wherein said solid sulfonic acid used as the catalytic agent is selected from the group consisting of:

any arenesulfonic acid ($Ar-SO_3H$)

any alkanesulfonic acid ($R-SO_3H$), any sulfonic acid resin, added as a finely divided powder, thymol blue in its acidic form and related triphenylmethane-sulfonic dyes, food dyes in their acidic form, or any long-chain alkyl hydrogen sulphate or aryl hydrogen sulphate, $RO-SO_3H$ or $ArO-SO_3H$, respectively.

7. The filter according to claim 1, wherein the polyphenols and the sulfonic acid are used, respectively, in a 1.0-2.0 and 0.1-1.0 w/w ratio.

8. The filter according to claim 1, wherein said block elements comprise granules obtained through a pressure compaction process of said one or more natural polyphenols and said catalytic agent, the polyphenols used in the granules are a mixture of resveratrol and resorcinol in a proportion between 10% and 75% of resveratrol and between 75% and 10% of resorcinol, wherein the solid sulfonic acid, $TsOH \cdot H_2O$ (p-toluenesulfonic acid), is present in a percentage of 15%; or the polyphenols used in the granules are a mixture of resveratrol and resorcinol in a proportion between 30% and 40% of resveratrol and between 40% and 30% of resorcinol, wherein the solid sulfonic acid, $TsOH \cdot H_2O$, is present in a percentage of 30%.

9. The filter according to claim 1, wherein said compacted block elements are in the form of pellets obtained through a pressure compaction process at room temperature of said one or more natural polyphenols and said catalytic agent with the addition of at least one binder or binding agent selected among cellulose, derivatives thereof or poly(1-vinylpyrrolidin-2-one), also called povidone or PVP, and wherein the polyphenols used in the pellets are a mixture of resveratrol and resorcinol in a proportion between 20% and 35% of resveratrol and between 35% and 20% of resorcinol, wherein the solid sulfonic acid, TsOH·H2O, is present in a 30% proportion and the binders or binding agents are present in a 15-20% proportion.

10. The filter according to claim 1, further comprising a plurality of casings arranged in a honeycomb configuration; said two air-permeable opposite walls being defined by two webs.

11. An air-purifying or air-decontaminating device, comprising the filter according to claim 1.

12. A method for removing aldehyde Volatile Organic Compounds (VOCs) from indoor air, wherein a controlled airflow of contaminated indoor air is passed through an air filter comprising a casing configured to act as a container, the container including two air permeable opposite walls configured to allow a flow therethrough of a volume of the indoor air the casing structured to housing one or more natural polyphenols and a catalytic agent, the aldehyde VOCs reacting with the one or more natural polyphenols in the presence of the catalytic agent, generating a polymeric polyphenol-aldehyde resin, which is retained in the filter, wherein the one or more natural polyphenols are in a powder state and are selected from a group consisting of: resveratrol (3,4',5-trihydroxystilbene), resorcinol (1,3-benzenediol), pyrogallol (1,2,3-benzenetriol), phloroglucinol (1,3,5-benzenetriol) and hydroquinone (1,4-benzenediol), or a combination thereof, the catalytic agent is a solid sulfonic acid, and a mixture of the one or more natural polyphenols and the catalytic agent is present, in the container, as compacted block elements.

13. The method of claim 12, wherein the contaminated indoor air further comprises amine VOCs and ammonia.

14. The method of claim 12, wherein the aldehyde VOCs are selected from a group consisting of: formaldehyde (HCHO, methanal), acetaldehyde or ethanal, glyoxal or ethanedial, propionaldehyde or propanal, acrolein or propenal, propargyl aldehyde or propynal, methylglyoxal or 2-oxopropanal, glyoxylic acid and their alkyl esters, butyraldehyde or butanal, isobutyraldehyde or 2-methylpropanal, methylacrolein or 2-methylpropenal, both isomers of crotonaldehyde or 2-butenal, valeraldehyde or pentanal and isovaleraldehyde or 3-methylbutanal.

15. The method of claim 12, wherein said compacted block elements are provided in the form of granules or in the form of pellets, wherein the granules have a diameter between 0.8 mm and 1.2 mm, and wherein the pellets have a diameter between 2.5 and 3.5 mm.

16. The method of claim 13, further comprising removing and substituting the air filter once an indicator of the filter has reached a saturation level, wherein the indicator operates as a result of:

a sulfonic acid-catalysed reaction of formaldehyde and related VOCs with the polyphenol or the polyphenol mixture included in the filter, when the sulfonic acid-catalysed reaction of formaldehyde and related VOCs with the polyphenol or the polyphenol mixture used in the filter is completed, or a change of colour of thymol blue and related dyes or of food dyes and related azo dyes, all of them used in their sulfonic acid forms, when the acid groups are neutralized by the amine-type VOCs, ammonia or aldehyde-amine derivatives.

* * * * *